UNITED STATES PATENT OFFICE.

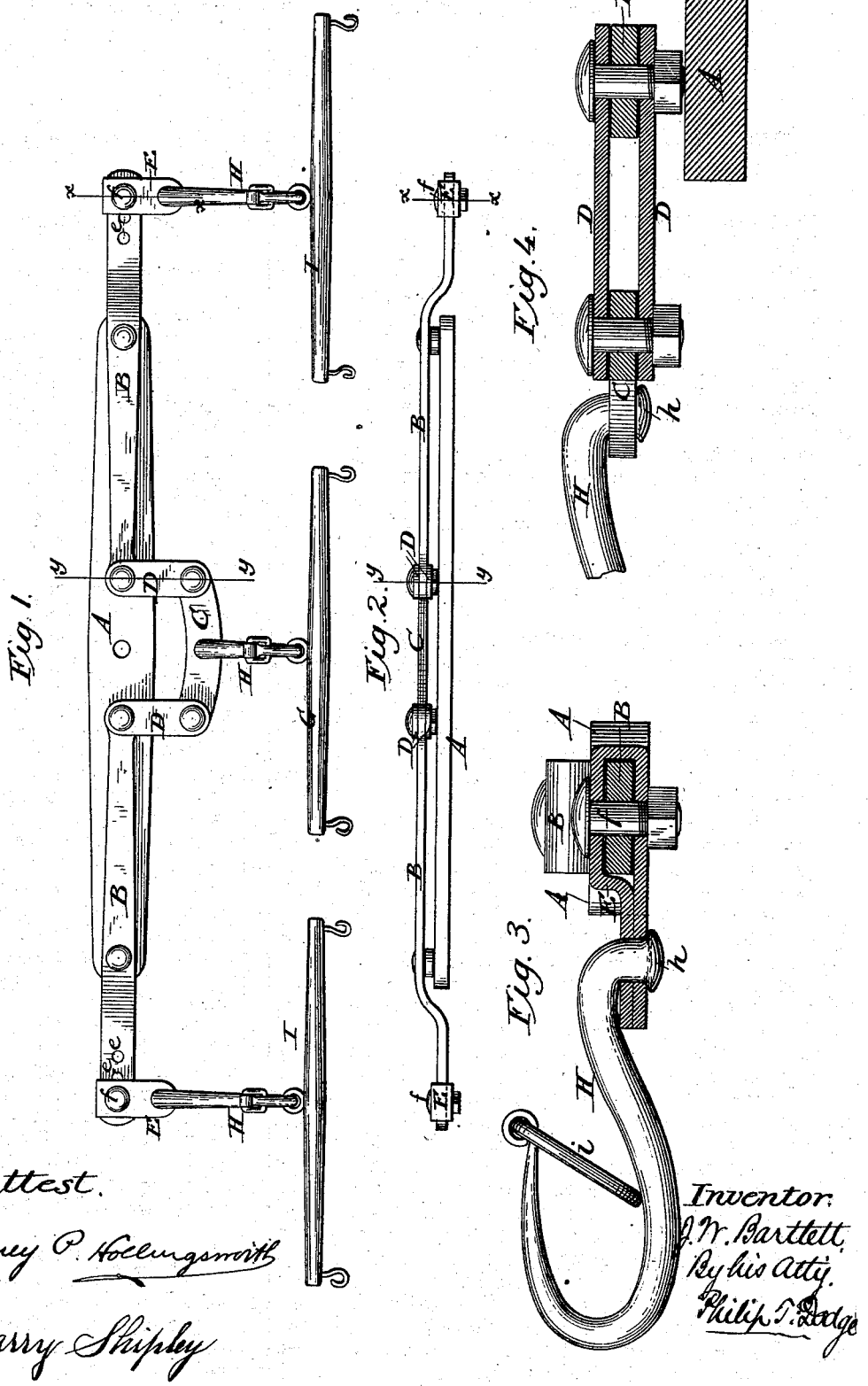

JOHN W. BARTLETT, OF MOLINE, ILLINOIS.

DRAFT-EQUALIZER.

SPECIFICATION forming part of Letters Patent No. 268,449, dated December 5, 1882.

Application filed June 26, 1882. (No model.)

*To all whom it may concern:*

Be it known that I, JOHN W. BARTLETT, of Moline, in the county of Rock Island and State of Illinois, have invented certain Improvements in Draft-Equalizers, of which the following is a specification.

This invention relates to that class of eveners or equalizers which are used for connecting three horses to a plow or similar implement or machine, and the object aimed at is to overcome the troubles incident to the use of the ordinary devices, particularly the tendency of the single-trees and their immediate connections to fall down upon the ground and against the heels of the draft-animals.

To this end the invention consists in certain improvements and details of construction hereinafter described.

Referring to the accompanying drawings, Figure 1 represents a top plan view of my improved evener. Fig. 2 is a rear elevation of the same. Fig. 3 is a cross-section on the line $x\ x$. Fig. 4 is a cross-section on the line $y\ y$.

Referring to the drawings, A represents the main or double tree, which will be hung on a pivot at the center, as usual.

On the main tree there will be pivoted, at opposite ends, two horizontal draft-levers, B B, each having its inner end twice or substantially twice the length of the outer. The inner ends of the two levers are connected by intermediate links, D, to the respective ends of a draft-plate C, each end being connected to the corresponding lever by means of two of the links, one on top and the other on the under side, as shown. The links are connected to the lever and the plate by vertical bolts, by which the links are caused to embrace and hold closely the ends of the other parts, whereby the levers and links are caused to sustain the plate on a level with the levers and prevent it from falling downward. The levers have their outer ends bent or curved downward to a level with the double-tree, as clearly shown in Fig. 2, this feature being important, in that it causes the draft to hold the levers and the double-tree from tipping or turning downward and forward as they would otherwise do. This feature is the more important because the levers are subjected, through the links, to the weight of the plate C and its attachments, tending to tip them downward. Each lever has its outer end provided with a series of holes, $e$, and with a longitudinally-adjustable plate, E, adapted to encircle the end of the lever, and secured in place by means of a vertical pin, $f$.

To each of the plates E, I secure by a draft-hook, H, a single-tree, I, and to the central draft-plate, C, I connect, in like manner, the intermediate single-tree, G. The draft-hooks are constructed in the peculiar manner represented in Figs. 1 and 3, their rear ends extending over the upper surface of the plate to which they are attached, and being extended thence downward through the plates, and provided on their lower ends with heads or enlargements $h$, as shown in Fig. 3. This construction permits the hooks to swing laterally with perfect freedom, but maintains them positively in a horizontal position, so as to prevent them from falling downward. Each hook may be provided with a falling link or latch, $i$, to prevent the disengagement of the single-trees, or they may be otherwise constructed to that end.

It will be observed that under the system of connections above described the draft strain will be divided equally among the three animals connected to the respective single-trees. It will also be seen that by adjusting the plates E endwise upon the levers the labor may be proportioned among the three animals, as circumstances may require. It will, however, be observed, as a peculiarity of the arrangement described, that all three single-trees are sustained positively in their proper elevated position and prevented from falling or dropping out of position when relieved from strain.

I am aware that three-horse eveners have been made in a great variety of forms with two levers having single-trees attached to their outer ends and a third single-tree connected with their inner ends; but I am not aware that any one has constructed and arranged the parts in the peculiar manner hereinbefore described.

Having thus described my invention, what I claim is—

1. In a three-horse equalizer, the combination of the double-tree A, levers B B, pivoted thereon and curved downward at their outer ends, the intermediate connection, C, connected to and upheld by means of the levers, as described, and the three single-trees attached to the outer ends of the levers and to the central connection, respectively, by means of hooks, the draft-rods $h$, adapted to give positive support to the said single-trees, as shown, whereby the draft of the team is applied to prevent the rolling of the levers and their connections, and the single-trees are positively supported against falling.

2. The combination of the double-tree A, the levers B, pivoted thereon, and having their ends curved downward and perforated, as shown, the central connecting-link, C, attached to the levers by links D D, and the adjustable plates E, mounted upon and around the outer ends of the levers, as shown.

3. In combination with the double-tree A, the levers B B, lying at their inner ends on top of the double-tree and curved downward at their outer ends to receive the draft-connections, the intermediate draft-plate, C, and the links D D, connecting the respective ends of the draft-plate with the corresponding ends of the levers.

JOHN W. BARTLETT.

Witnesses:
FRANK SMITH,
EUGENE LEWIS.